(12) United States Patent
Suddreth et al.

(10) Patent No.: US 8,155,806 B2
(45) Date of Patent: Apr. 10, 2012

(54) AIRCRAFT DISPLAY SYSTEMS AND METHODS FOR ENHANCED DISPLAY OF LANDING INFORMATION

(75) Inventors: John G. Suddreth, Cave Creek, AZ (US); Aaron J. Gannon, Anthem, AZ (US); Gang He, Morristown, NJ (US); Thea L. Feyereisen, Hudson, WI (US)

(73) Assignee: Honeywell International Inc., Morristown, NJ (US)

( * ) Notice: Subject to any disclaimer, the term of this patent is extended or adjusted under 35 U.S.C. 154(b) by 906 days.

(21) Appl. No.: 12/178,508

(22) Filed: Jul. 23, 2008

(65) Prior Publication Data

US 2010/0023189 A1 Jan. 28, 2010

(51) Int. Cl.
*G06F 19/00* (2011.01)
(52) U.S. Cl. ............................... 701/16; 701/3; 701/14
(58) Field of Classification Search ........... 701/3, 14–16
See application file for complete search history.

(56) References Cited

U.S. PATENT DOCUMENTS

| | | | |
|---|---|---|---|
| 5,296,854 A | 3/1994 | Hamilton et al. | |
| 5,343,395 A | 8/1994 | Watts | |
| 5,798,713 A | 8/1998 | Viebahn et al. | |
| 6,014,117 A | 1/2000 | Hennessy et al. | |
| 6,085,150 A | 7/2000 | Henry et al. | |
| 6,157,876 A | 12/2000 | Tarleton, Jr. et al. | |
| 6,405,107 B1* | 6/2002 | Derman ............................ | 701/3 |
| 6,486,799 B1 | 11/2002 | Still et al. | |
| 6,529,820 B2* | 3/2003 | Tomescu ....................... | 701/120 |
| 6,583,733 B2 | 6/2003 | Ishihara et al. | |
| 6,678,588 B2 | 1/2004 | He | |
| 6,690,299 B1 | 2/2004 | Suiter | |
| 6,879,886 B2 | 4/2005 | Wilkins, Jr. et al. | |
| 7,091,881 B2 | 8/2006 | Judge et al. | |
| 7,106,217 B2 | 9/2006 | Judge et al. | |
| 7,167,782 B2* | 1/2007 | Humbard et al. ................. | 701/3 |
| 7,286,062 B2 | 10/2007 | Feyereisen et al. | |
| 7,298,291 B2 | 11/2007 | von Thal et al. | |
| 7,365,652 B2* | 4/2008 | Scherbarth .................... | 340/974 |
| 7,589,645 B2* | 9/2009 | Schmidt ........................ | 340/960 |
| 7,642,929 B1* | 1/2010 | Pinkus et al. ................. | 340/973 |
| 7,747,364 B2* | 6/2010 | Roy et al. ........................ | 701/28 |
| 7,804,981 B2* | 9/2010 | Viggiano et al. .............. | 382/104 |
| 2003/0132860 A1 | 7/2003 | Feyereisen et al. | |

FOREIGN PATENT DOCUMENTS

| | | |
|---|---|---|
| EP | 1016851 A1 | 7/2000 |
| EP | 1959239 A1 | 8/2008 |
| EP | 2056273 A1 | 5/2009 |

OTHER PUBLICATIONS

EP Search Report, EP 09164839.4-2206 dated Nov. 10, 2009.

* cited by examiner

*Primary Examiner* — Hussein A. Elchanti
(74) *Attorney, Agent, or Firm* — Ingrassia Fisher & Lorenz, P.C.

(57) ABSTRACT

A display system is provided for a vehicle. The system includes a processor configured to receive data representative of landing information and navigation and control information and to supply display commands associated with the landing information and navigation and control information; and a display device coupled the processor for receiving the display commands and operable to render a three-dimensional view, including first symbology representing the landing information and second symbology representing the navigation and control information. The second symbology is superimposed on the first symbology.

17 Claims, 2 Drawing Sheets

AIRCRAFT DISPLAY SYSTEMS AND METHODS FOR ENHANCED DISPLAY OF LANDING INFORMATION

TECHNICAL FIELD

The present invention generally relates to aircraft display systems and methods and, more particularly, to systems and methods for enhanced display of landing information.

BACKGROUND

Computer generated aircraft displays have become highly sophisticated and are capable of displaying a substantial amount of flight management, navigation, and control information that gives flight crews more effective control of the aircraft and a reduction in workload. In this regard, electronic displays, such as Heads-Up Displays (HUDs) and Heads-Down Displays (HDDs), are used in aircraft as Primary Flight Displays to display important flight management, navigation, and control information to flight crews.

Primary Flight Displays are computer-generated displays that provide flight crews with real-time visual representations of the operational states of their aircraft during flights. For example, the Primary Flight Display can combine critical flight instrumentation (e.g., altitude, attitude, heading, airspeed, vertical speed instruments) and primary engine instrument indicators into a single, readily interpretable display. As a result, Primary Flight Displays have become effective visual tools for controlling aircraft, reducing pilot workload, increasing situational awareness, and improving overall flight safety.

Certain flight information displayed on Primary Flight Displays, particularly landing information, is useful in maintaining proper aircraft safety and control. Indeed, there are some situations in which it is desirable to focus the pilot's attention on this information. As an example, the pilot's attention should typically be directed to the landing information during a landing approach. Other information may still be important during such situations, however, particularly the altitude, airspeed, and heading. In the landing approach situation, the pilot usually quickly diverts his or her attention back and forth between the landing information and the other relevant information.

Accordingly, it is desirable to provide systems and methods that increase the visibility of certain flight information on a visual display, such as, for example, a Primary Flight Display, similar electronic aircraft displays, and other types of electronic displays. Particularly, it is desirable to provide systems and methods for increasing the information displayed with the landing information. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a display system is provided for a vehicle. The system includes a processor configured to receive data representative of landing information and navigation and control information and to supply display commands associated with the landing information and navigation and control information; and a display device coupled the processor for receiving the display commands and operable to render a three-dimensional view, including first symbology representing the landing information and second symbology representing the navigation and control information. The second symbology is superimposed on the first symbology.

In accordance with another exemplary embodiment, a method of displaying landing information in an aircraft display system is provided. The method includes displaying a first symbology representing the landing information; and displaying a second symbology representing navigation and control information that is superimposed on the first symbology.

In accordance with yet another exemplary embodiment, a display system for a helicopter includes a processor configured to receive data representative of landing information and navigation and control information and to supply display commands associated with the landing information and navigation and control information. A display device is coupled the processor for receiving the display commands and operable to render a three-dimensional view, including first symbology representing the landing information and second symbology representing the navigation and control information. The second symbology is superimposed on the first symbology, displayed as a function of use conditions, and represents at least one of lateral deviation information, heading information, speed information, and distance information

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments described herein provide visual display systems and methods for aircraft, particularly for rotorcraft such as helicopters and tiltrotor aircraft. More specifically, the visual display system may display an image that includes landing information superimposed with other navigation and control information.

Figure 1:
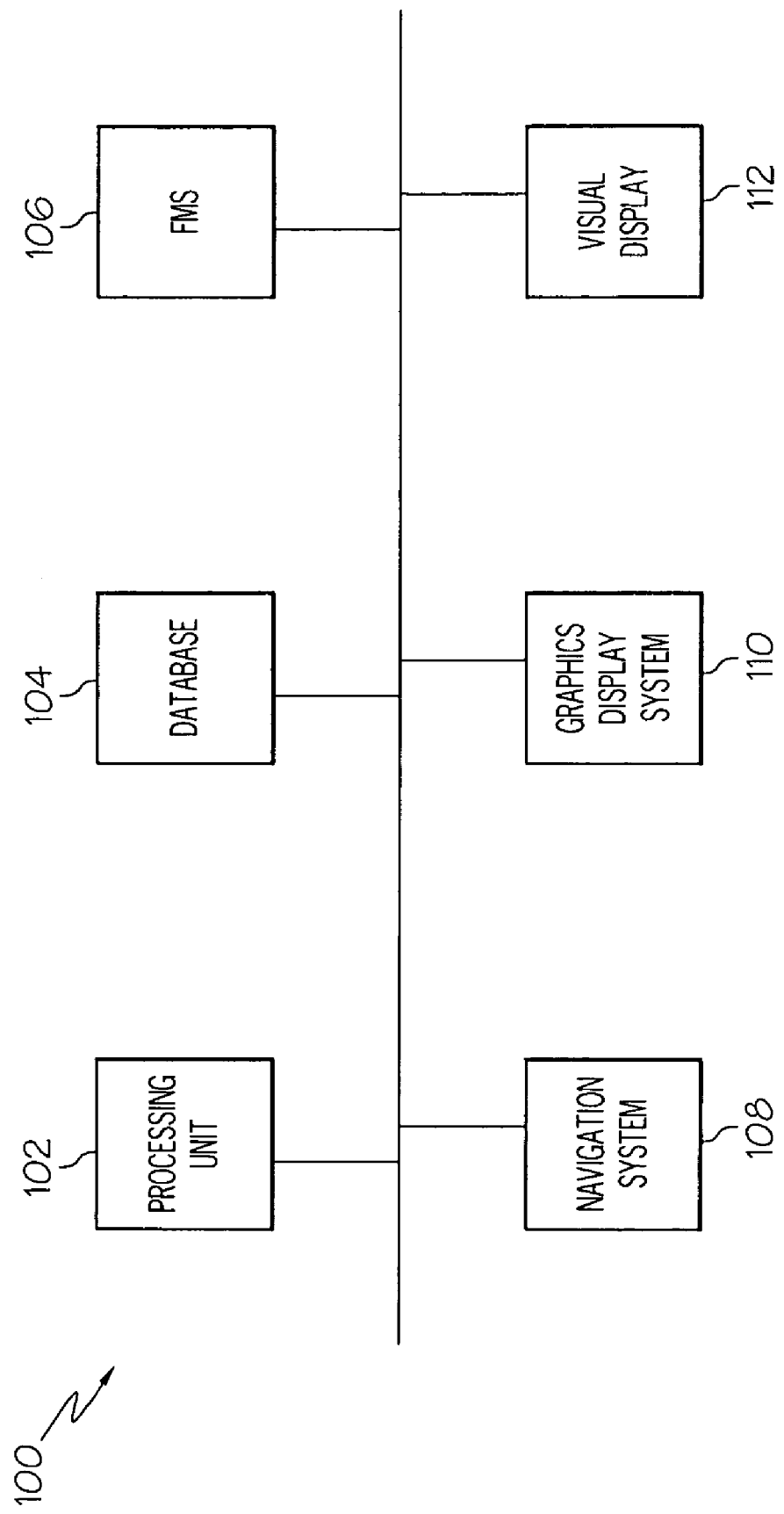
FIG. 1 is a functional block diagram of an aircraft display system according to an exemplary embodiment.

FIG. 1 depicts a block diagram of an exemplary display system 100 for increasing the visibility and accessibility of pertinent information during a landing situation. As discussed below, the display system 100 can render images that include landing information superimposed with other navigation and control information.

The system 100 includes a processing unit 102, a database 104, a flight management system 106, a navigation system 108, a graphics display generator 110, and a visual display 112. Notably, it should be understood that although the system 100 appears in FIG. 1 to be arranged as an integrated system, the system 100 is not so limited and can also include an arrangement whereby one or more of the processing unit 102, the database 104, the flight management system 106, the navigation system 108, the graphics display generator 110, and the visual display 112 is a separate component or a subcomponent of another system located either onboard or external to an aircraft. Also, for example, the system 100 can be arranged as an integrated system (e.g., aircraft display system, Primary Flight Display system, etc.) or a subsystem of a more comprehensive aircraft system (e.g., flight management system, navigation and control system, target aiming and control system, collision alert and/or avoidance system, weather avoidance system, etc.). The system 100 can be utilized in an aircraft, such as a helicopter, airplane, or unmanned vehicle. Moreover, exemplary embodiments of the system 100 can also be utilized in spacecraft, ships, submarines, fixed wing and rotor aircraft, such as helicopters, as well as other types of vehicles. For simplicity, embodiments are described below with reference to "aircraft."

For this embodiment, the processing unit 102, such as a control display unit (CDU), can be a computer processor such as, for example, a microprocessor, digital signal processor, or any suitable processor capable of at least receiving and/or retrieving aircraft flight management information (e.g., from the flight management system 106), navigation and control information (e.g., from the navigation system 108), and landing, target and/or terrain information (e.g., from the database 104); generating display control signals for a visual display of the aircraft flight management information, the navigation and control information (including, for example, a zero pitch reference line, one or more heading indicators, tapes for airspeed and altitude, etc.), target, waypoint, and/or terrain information, and a flight path marker (or similar type of aircraft aiming symbol); and sending the generated display control signals to a graphics display generator (e.g., the graphics display generator 110) associated with a visual display (e.g., the visual display 112).

Database 104 is coupled to processor 102 and can be a memory device (e.g., non-volatile memory, disk, drive, tape, optical storage device, mass storage device, etc.) that can store digital landing, waypoint, target location, and terrain data (e.g., latitudinal and longitudinal data) as either absolute coordinate data or as a function of an aircraft's position. Database 104 includes data defining the actual geographical boundaries of numerous airports and runways. Database 104 can also include, for example, a terrain database, which can include the locations and elevations of natural terrain obstacles such as mountains or other elevated ground areas, and also the locations and elevations of man-made obstacles such as radio antenna towers, buildings, bridges, etc. Navigation data stored in database 104 can be received from external, up-linked sources, or an onboard device that senses and maps man-made obstacles (e.g., airports, runways, etc.) and variations in terrain, such as, for example, a Forward Looking Infrared (FLIR) sensor, or an active or passive type of radar device.

The flight management system 106 and the navigation system 108 are coupled to processing unit 102. The flight management system 106 and/or the navigation system 108 can provide navigation data associated with the aircraft's current position and flight direction (e.g., heading, course, track, etc.) to the processing unit 102. The navigation data provided to the processing unit 102 can also include information about the aircraft's airspeed, altitude, pitch, and other important flight information, if such information is desired. In any event, for this exemplary embodiment, the flight management system 106 and/or the navigation system 108 can include any suitable position and direction determination devices that are capable of providing the processing unit 102 with at least an aircraft's current position (e.g., in latitudinal and longitudinal form), the real-time direction (heading, course, track, etc.) of the aircraft in its flight path, the waypoints along the flight path, other important flight information (e.g., pitch, airspeed, altitude, attitude, etc.), and, depending on the situation, landing information. Information can be provided to the processing unit 102 by, for example, an Inertial Reference System (IRS), Air-data Heading Reference System (AHRS), and/or a global positioning system (GPS).

For this embodiment, the system 100 also includes the graphics display generator 110 coupled to the processing unit 102 and the visual display 112. The visual display 112 may include any device or apparatus suitable for displaying various types of computer generated symbols and information representing at least pitch, heading, flight path, airspeed, altitude, landing information, waypoints, targets, terrain, and flight path marker data in an integrated, multi-color or monochrome form. Using data retrieved (or received) from the flight management system 106 and/or the navigation system 108, the processing unit 102 executes one or more algorithms (e.g., implemented in software) for determining the position of waypoints, a flight path marker, landing information, a zero pitch reference line, and heading indicators on the visual display 112. The processing unit 102 then generates a plurality of display control signals representing the waypoints, flight path marker, zero pitch reference line, heading indicators, and airspeed and altitude tapes (along with target and terrain data from the database 104), and sends the plurality of display control signals to the visual display 112 via the graphics display generator 110. In this embodiment, the visual display 112 is an aircraft cockpit, multi-color display (e.g., a Primary Flight Display). The graphics display generator 110 interprets the display control signals and generates suitable landing information, waypoints, flight path marker, zero pitch reference line, heading indicator, airspeed tape, altitude tape, target, and terrain symbols, which are presented on a screen or monitor of the visual display 112.

Although a cockpit display screen may be used to display the above-described flight information symbols and data, any suitable type of display medium capable of visually presenting multi-colored or monochrome flight information for a pilot or other flight crew member can be provided, such as, for example, various CRT and flat-panel display systems (e.g., CRT displays, LCDs, OLED displays, plasma displays, projection displays, HDDs, HUDs, etc.).

Figure 2:
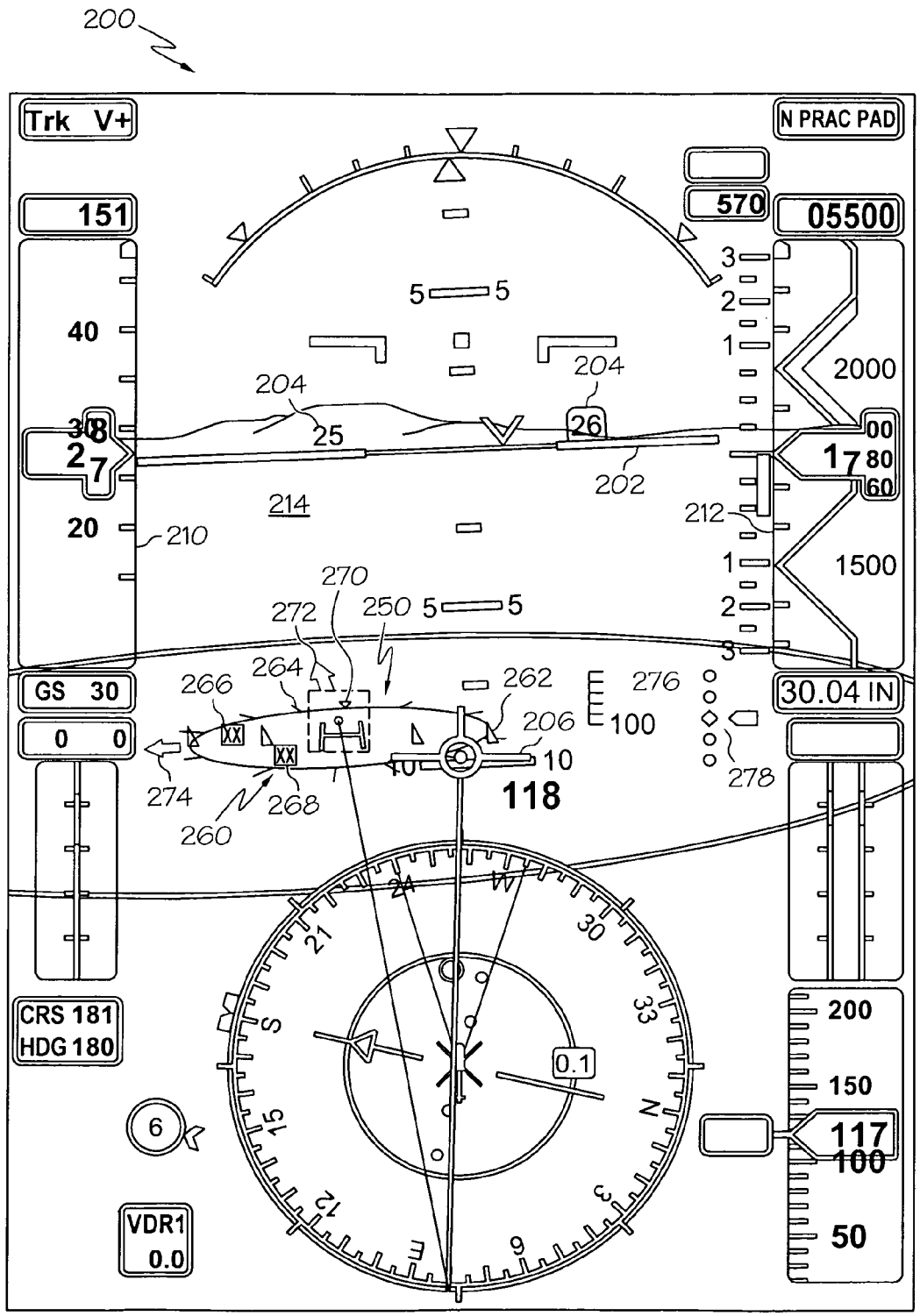
FIG. 2 depicts an exemplary image that may be rendered by the aircraft display system of FIG. 1.

FIG. 2 depicts an exemplary visual display 200 that may be rendered by the aircraft display system 100 of FIG. 1. The display 200 shows, among other things, computer generated symbols representing a zero pitch reference line (e.g., commonly referred to as a horizon line) 202, two heading indicators 204, a flight path marker (also known as a flight path vector or velocity vector) 206, an airspeed scale or tape 210, an altitude scale or tape 212, and terrain (e.g., identified generally as element 214). In this embodiment, the terrain 214 is rendered as a three-dimensional, perspective view. The terrain 214 can include any representation of the environment surrounding the aircraft, including flattened terrain. Additionally, the terrain 214 can include a virtual plane selected by a pilot at certain elevation relative to the aircraft and is rendered at that elevation. Although the display 200 is shown as an egocentric, first-person frame of reference, the display 200 can be a secondary, wingman, and/or plan or perspective view that enables a viewer to view the aircraft, as well as zoom in and out.

In addition, and as will now be described in more detail, the display 200 may also selectively render landing information 250. The landing information 250 can represent any intended destination or other type of geo-referenced symbol along a flight path. In the depicted embodiment, the landing information 250 is a conformal, circular shaped landing pad, although other shapes and configurations can be provided. During operation, the pilot typically locates the landing information 250 on the display 200, and aims the aircraft in the direction of the landing information 250. The location and placement of the landing information 250 can be identified from a flight plan, user selected from the database 104 (FIG. 1), provided by a user via one or more of the user interfaces (e.g., keyboard, CCD, voice control, mind responsive device), or provided or selected from the external data sources, for example, with a datalink to the cockpit from the ground. The representation of landing information 250 may be a function of the distance of the landing information 250 from the aircraft. As will be described in further detail below, the landing information 250 can be modified as the aircraft approaches.

In accordance with an exemplary embodiment and discussed in further detail below, navigation and control information 260 may be superimposed on the landing information 250. The term "superimposed" can include navigation and control information 260 that is displayed directly on, at least partially on, or immediately adjacent to the landing information 250. The navigation and control information 260 can include many types of information, including lateral deviation, heading, track, speed, distance, relative altitude to the target, current speed along and across heading directions. The display of the navigation and control information 260 can be dynamic based on the relative position of the aircraft and landing information 250. For example, the navigation and control information 260 can appear on the landing information 250 as the aircraft approaches the landing pad, such as at a predetermined distance. In one embodiment, the navigation and control information 260 conforms to the terrain 214, although this is not necessary.

As shown in the depicted embodiment of FIG. 2, the navigation and control information 260 can include lateral deviation symbology 262. Perspective lateral deviation symbology 262 provides intuitive displays to flight crews of current position in relation to an intended flight path. In particular, lateral deviation symbology 262 indicates to a flight crew the amount by which the aircraft has deviated to the left or right of an intended course. Deviation bars of the lateral deviation symbology 262 represent a fixed ground distance from the intended flight path. As the aircraft pitches, ascends or descends, the display distance between the deviation bars will vary. However, the actual ground distance from the intended flight path represented by the deviation bars of the lateral deviation symbology 262 remains the same. Therefore, the flight crews can determine position information with reduced workload by merely observing the position of the aircraft in relation to the deviation bars. The position information, and particularly the lateral deviation represented by the lateral deviation symbology 262, is especially important during landing. The lateral deviation symbology 262 superimposed on the landing information 250 conveniently provides this information.

Similarly, the navigation and control information 260 can also include heading symbology 264. The heading symbology 264 can include tick marks indicating the heading surrounding the landing pad of the landing information 250, although other types of symbology indicating the heading can be provided. Numerical symbology 266, 268 can also form part of the navigation and control information 260 superimposed on the landing information 250. For example, numerical symbology 266 representing the speed of the aircraft and numerical symbology representing the distance of the aircraft from the landing information 250 are depicted in FIG. 2 within the landing pad of the landing information 250.

The navigation and control information 260 can further include a heading indicator 270, an along heading speed indicator 272, an across heading speed indicator 274, and a relative altitude indicator 276. The relative altitude indicator 276 includes a numerical value that is conformally traced onto the terrain 214 at the base of the indicator 276. The navigation and control information 260 may be modified based on changing flight conditions. For example, the length of the relative altitude indicator 276 may shrink as the altitude increases. The relative altitude indicator 276 may also be referenced relative to the terrain 214 such that the relative altitude indicator 276 indicates the altitude of the aircraft relative to the terrain 214, including obstacles in the terrain. As another example, the speed indicators 272, 274 can change color if the values are determined to be unsafe based on landing parameters.

The navigation and control information 260 can further include a simulated visual glide path indicator 278 simulating an airport lighting aid. In the example shown, the airport lighting aid simulated is a Visual Approach Slope Indicator (VASI) system, which is available at most airports, although other lighting aid system simulations can be provided. VASI systems generally provide vertical visual approach slope guidance to an airport runway. Accordingly, the VASI example of simulated visual glide path indicator 278 illustrated includes two circular indicator lights above and below a diamond light, which represents the ideal glide path. The position of an arrow indicates the glide path of the aircraft relative to the ideal glide path. Colors can be provided to the circular indicators to further enhance pilot awareness. The glide path indicator 278 can be vertical or conformal to the terrain 214.

In general, display of the navigation and control information 260 can provide important information in a more convenient position for the pilot. As such, during an approach and/or landing operation, the pilot can concentrate on the landing information 250 without detracting attention from the navigation and control information 260. This can reduce pilot workload and navigation and control errors, and increase flight safety.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system for a vehicle, comprising:
   a processor configured to receive data representative of landing information and navigation and control information and to supply display commands associated with the landing information and navigation and control information; and
   a display device coupled the processor for receiving the display commands and operable to render a three-dimensional view, including first symbology representing the landing information and second symbology representing the navigation and control information, the second symbology superimposed on the first symbology.

2. The display system of claim 1, wherein the navigation and control information represented by the second symbology is lateral deviation symbology.

3. The display system of claim 1, wherein the navigation and control information represented by the second symbology is heading information.

4. The display system of claim 3, wherein the first symbology is a landing pad and the second symbology includes tick marks surrounding the landing pad.

5. The display system of claim 1, wherein the first symbology is a helicopter landing pad, and wherein the navigation and control information represented by the second symbology is speed information superimposed within the landing pad.

6. The display system of claim 1, wherein the first symbology is a helicopter landing pad, and wherein the navigation and control information represented by the second symbology is distance information superimposed within the landing pad.

7. The display system of claim 1, wherein the second symbology is numerical.

8. The display system of claim 1, wherein the second symbology is displayed as a function of a distance between the vehicle and a landing location.

9. The display system of claim 1, wherein the second symbology is displayed during an approach and landing operation.

10. The display system of claim 1, wherein the second symbology is displayed as a function of use conditions.

11. The display system of claim 1, wherein the second symbology is displayed within the first symbology.

12. The display system of claim 1, wherein the three-dimensional view includes terrain symbology and wherein the second symbology conforms the terrain symbology.

13. The display system of claim 1, wherein the navigation and control information represented by the second symbology is at least one of across heading speed and along heading speed.

14. The display system of claim 13, wherein the second symbology changes appearance if the at least one of the across heading speed and the along heading speed exceeds safe landing parameters.

15. The display system of claim 1, wherein the navigation and control information represented by the second symbology is relative altitude information that indicates the altitude of the aircraft relative to terrain.

16. The display system of claim 7, wherein the numerical second symbology is conformal to terrain in the three-dimensional view.

17. A display system for a helicopter, comprising:
   a processor configured to receive data representative of landing information and navigation and control information and to supply display commands associated with the landing information and navigation and control information; and
   a display device coupled the processor for receiving the display commands and operable to render a three-dimensional view, including first symbology representing the landing information that includes a helicopter landing pad and second symbology representing the navigation and control information,
   the second symbology superimposed on the first symbology within the helicopter landing pad, displayed as a function of use conditions, and representing at least one of lateral deviation information, heading information, speed information, and distance information.

\* \* \* \* \*